(12) United States Patent
Steinich

(10) Patent No.: US 7,944,201 B2
(45) Date of Patent: May 17, 2011

(54) SLIDING ELEMENT WITH POSITION INDICATOR

(75) Inventor: Klaus Manfred Steinich, Zorneding (DE)

(73) Assignee: ASM Automation Sensorik Messtechnik GmbH, Moosinning, DE (US)

( * ) Notice: Subject to any disclaimer, the term of this patent is extended or adjusted under 35 U.S.C. 154(b) by 959 days.

(21) Appl. No.: 11/825,029

(22) Filed: Jul. 3, 2007

(65) Prior Publication Data

US 2008/0007252 A1    Jan. 10, 2008

(30) Foreign Application Priority Data

Jul. 7, 2006  (DE) .......................... 10 2006 031 562
Oct. 10, 2006 (DE) .......................... 10 2006 047 966

(51) Int. Cl.
*G01B 7/14* (2006.01)

(52) U.S. Cl. .............................. 324/207.13; 324/207.24
(58) Field of Classification Search ............. 324/207.13, 324/207.24
See application file for complete search history.

(56) References Cited

U.S. PATENT DOCUMENTS 3,894,433 A * 7/1975 Riester et al. .............. 73/861.56
5,249,473 A * 10/1993 Kawabata .................... 73/865.9

\* cited by examiner

*Primary Examiner* — Reena Aurora
(74) *Attorney, Agent, or Firm* — Head, Johnson & Kachigian, P.C.

(57) ABSTRACT

The position indicator for a stick shaped sensor is received in a particularly annular sliding element, comprised of wear resistant, slide capable material as e.g. plastic, with an extended guidance length, which additionally comprises axial flow channels for the pressure medium in order to avoid local pressure buildup.

44 Claims, 3 Drawing Sheets

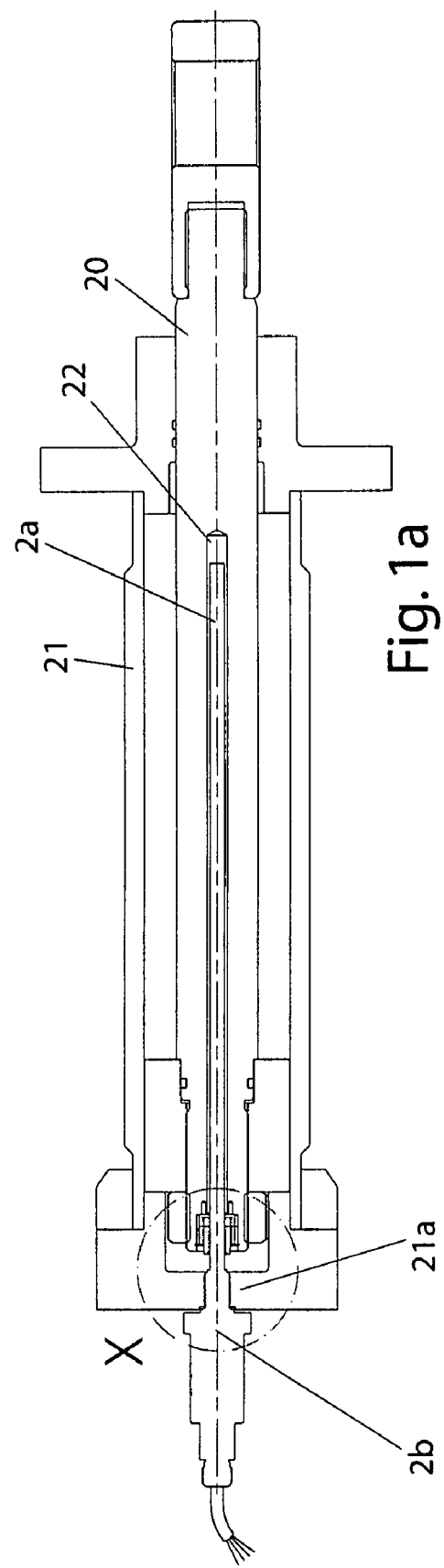

SLIDING ELEMENT WITH POSITION INDICATOR

CROSS-REFERENCE TO RELATED APPLICATIONS

This application claims priority to German Patent Application No. 10 2006 031562.6 filed 7 Jul. 2006 and to German Patent Application No. 10 2006 047966.1 filed 10 Oct. 2006.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to position or velocity sensors.

2. Description of the Related Art

Position and velocity sensors are often based on the effect of external magnetic fields, e.g. according to the magneto-inductive or the magnetostrictive functional principle.

In such sensors, the current position of the component to be monitored is determined by detecting a position indicator mounted to the component with respect to its position relative to the remainder of the sensor, thus the sensor unit.

Depending on the functional principle, the position indicator can be a metal part or a magnet which can either be disposed and moved on one side next to the sensor unit or can enclose it in an annular manner as a bushing. Hereinafter, a magnetostrictive sensor is referred to in an exemplary manner in order to designate the components in a simplified manner, without restricting the invention, in which the sensor unit is designated as wave conductor unit and the position indicator is designated as magnet or ring magnet.

Thus, a typical application for this is a hydraulic cylinder or pneumatic cylinder in order to determine the position of the piston in the cylinder.

The wave conductor unit is thus mounted to the head of the cylinder in a solid manner and protrudes into a center bore in the interior of the piston. The position indicting ring magnet is thus mounted in the forward, expanded end of the center bore in the piston rod.

Though the interior diameter of the annular magnet is selected larger than the exterior diameter of the wave conductor unit, both often slide on each other during their relative motion, since the wave conductor unit is fixed only on one side, and can be laterally deflected in a substantial manner due to lengths of up to 6 m, this can occur through oscillations or jolts during the operation, or also simply due to its own weight, in case of a non-vertical, but slanted or horizontal installation.

In case of a friction induced wear on the ring magnets, which can lead to the destruction of the magnet and thus to the non-functionality of the entire sensor and necessitating a replacement of the magnet, the ensuing costs through shutdown times of the respective machinery are typically higher than the cost of the sensors itself.

Often a canting of the magnet, relative to the wave conductor unit, and an associated kinking and destruction of the wave conductor unit occurs which is also caused by a previous undue wear at the interior circumference of the magnet or by an insufficient axial guidance length.

Also, the bushings made from aluminum or brass, which were used so far for receiving the magnet, have only partially solved these problems, since their friction coefficients were not optimum, neither were their guidance length.

In addition, there is the possibility that the wear properties, the occurring abrasion material, the canting of the annular magnet, and the kinking of the wave conductor unit are facilitated by the locally occurring pressure conditions within the cylinder which occur though the fact that the magnet acts as a throttle location for the hydraulic medium.

Thus, for functionality reasons, hydraulic fluid does not necessarily have to penetrate into the central bore for the wave conductor unit in the piston rod beyond the ring magnet, however, the ring magnet never seals this space reliably, since it would have to withstand the high working pressure in the piston.

On the other hand, the radial clearance is too small for the ring magnet not having to be considered as a throttle body for the fluid flow into this space.

BRIEF SUMMARY OF THE INVENTION

It is an object of the present invention to provide a sliding element for receiving a position indicator of an e.g. magnetostrictive sensor or to provide a sensor equipped therewith which is simple and cost effective to manufacture and which avoids the disadvantages of the state of the art.

In the following description of the invention, the position indicator is referred to as a magnet in an exemplary manner, and the sensor unit is referred to as a wave conductor unit, and thus, a magnetostrictive sensor is referred to, without limiting the invention thereupon, which is applicable for all sensors mentioned above.

Since the sliding element in which the magnet is disposed has sufficient sliding capability relative to the wave conductor unit and high abrasion resistance, no destruction occurs through wear due to abrasion material.

Since the radial clearance between the interior circumference of the bushing and the outer circumference of the wave conductor unit is kept very small while the axially supported length between the two is large, there can be no canting when sliding the magnet. Thus, the sliding element is preferably made from a material with a large sliding coefficient, in particular, from a plastic like for example PA or PEEK, which additionally has a small friction coefficient relative to the wave conductor unit, which is mostly made from steel or titanium, and good cold flow properties and small water absorption.

Thus, the magnet is disposed close to the interior diameter at the sliding element so that only a thin radial inner wall separates it from the interior diameter of the bushing so that it is disposed at an optimum distance from the wave conductor unit.

Thus, the axial extension of the sliding element should be at least twice the diameter of the sensor element, better the quadruple diameter of the sensor element. However, in order to avoid canting, the radial clearance between the two of them should be +/−0.5 at the most, at least +/−0.1 mm of the diameter of the wave conductor unit.

Also, the beveling or strong rounding of the ends of the interior circumferential surface contributes to this avoidance.

In order to provide the unsupported length as long as possible, the interior diameter of the sliding element relative to the exterior diameter is even axially extended so that the snap ring holding the sliding element in place is disposed in an indentation in the outer circumference of the sliding element.

The axial flow channels through the sliding element, provided as bores or grooves in the outer circumference, allow for a pressure equilibration between both sides and thus the avoidance of local pressure buildup. The frontal flow grooves serve the same purpose, connecting the orifices of these flow channels with the interior diameter and the dead-end hole therein of the receiving piston rod.

While the magnet is almost automatically received next to one of the axial ends of the sliding element in a one-piece embodiment of the sliding element, in a two-part embodiment, shaped as two axially connecting parts, the magnet can be disposed in an annular groove of one of the front faces, forming the contact surface with the other partial element, and thus, e.g. in the middle longitudinal areas of the sliding element, additionally well protected against any kind of damages.

For this purpose, the magnet is covered on both sides or on one side by flux guidance pieces, which can also be provided mostly annular, bonded or encased in the respective annular groove, or only held through a respective protrusion of the other partial element in a form locking manner.

The two partial elements are radially centered relative to each other through an annular flange at the outer circumference of the one partial element which engages into a respective indentation of the other partial element.

In the rear face of the sliding element, furthermore, an elastomer element, e.g. an O-ring, is half received in an annular groove which serves as a buffer ring when the sliding element stops at the bottom of the receiving dead-end hole.

The two partial elements are preferably glued or screwed together, and the entire sliding element is preferably held in the provided indentation through a snap ring.

BRIEF DESCRIPTION OF SEVERAL VIEWS OF THE DRAWINGS

Embodiments according to the invention are subsequently described in more detail in an exemplary manner.

FIGS. 1a and 1b show the application in a hydraulic piston.

DESCRIPTION OF THE PREFERRED EMBODIMENTS

Figure 1B:
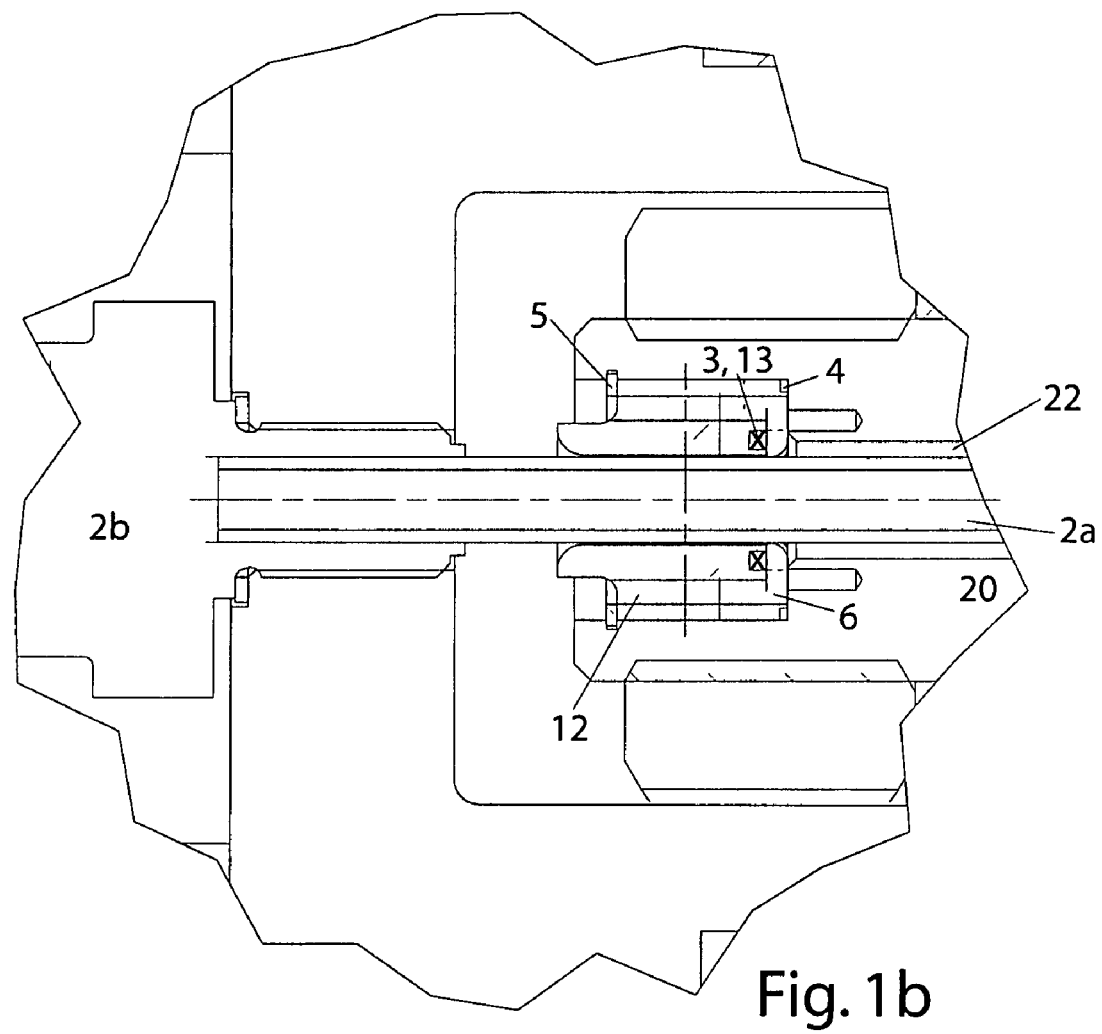

FIG. 1 shows a magnetostrictive sensor 2 according to the invention in a longitudinal sectional view which is installed in a hydraulic piston cylinder unit, with its tubular wave conductor unit 2a and an axially connecting enlarged head housing 2b.

Thus, sensor 2 with head housing 2b is placed externally onto the hydraulic piston bottom so that tubular wave conductor unit 2a extends through a cylinder bottom 21a in longitudinal direction, centrally in an interior of cylinder 21, being received in a center dead-end bore 22 of a piston rod 20, when piston rod 20 is inserted into cylinder 21.

A ring magnet 3 is mounted in an expanded orifice of dead-end bore 22 and thus moves together with piston rod 20, whose position is to be monitored.

Thereby, it immediately becomes apparent that the piston/cylinder unit has to be disassembled when an exchange of ring magnet 3 becomes necessary and, for this purpose, before that the hydraulic medium has to be drained, subsequently filled again, and bled which causes expenses and lost time.

In the expanded partial view of FIG. 1b the sliding element is more visible.

Movement of the magnet out of the dead-end hole is avoided through a snap ring 5 which engages into an annular groove of the piston rod in a form locking manner.

An O-ring, half received in an annular groove, serves as a buffer ring 4, axially between the sliding element 1, and the bottom of the indentation, and thus of piston rod 20.

The interior diameter 7 of sliding element 1 is made from a plastic which is abrasion resistant, slide capable and, in particular, self-lubricating, temperature resistant and chemically resistant against the hydraulic medium. Interior diameter 7 is provided axially longer than an external diameter 11 in order to provide the guidance length relative to wave conductor unit 2a as long as possible.

Axial flow channels 12 run through the guidance bushing 1 from the one front face to the other front face, and they are positioned so that buffer ring 4, as well as the snap ring 5, at least do not cover their orifices completely, preferably, not at all.

Additionally, flow grooves 6, which radially extend over the orifice of each flow channel 12 and reach to interior diameter 7 and thus to dead-end bore 22, are provided in the front face of sliding element 1 which faces piston rod 20.

The annular magnet 3 is housed in an indentation 13 which is open on the front side and separated from interior diameter 7 by a narrow inner wall and which is provided in the front face of sliding element 1, facing towards buffer ring 4.

Within flow channel 12, flow grooves 6 extend radially over indentations 13 so that ring magnet 3 does not axially extend into the area of flow grooves 6.

The axial ends of interior diameter 7 are provided as lead in radius 8.

Figure 2:
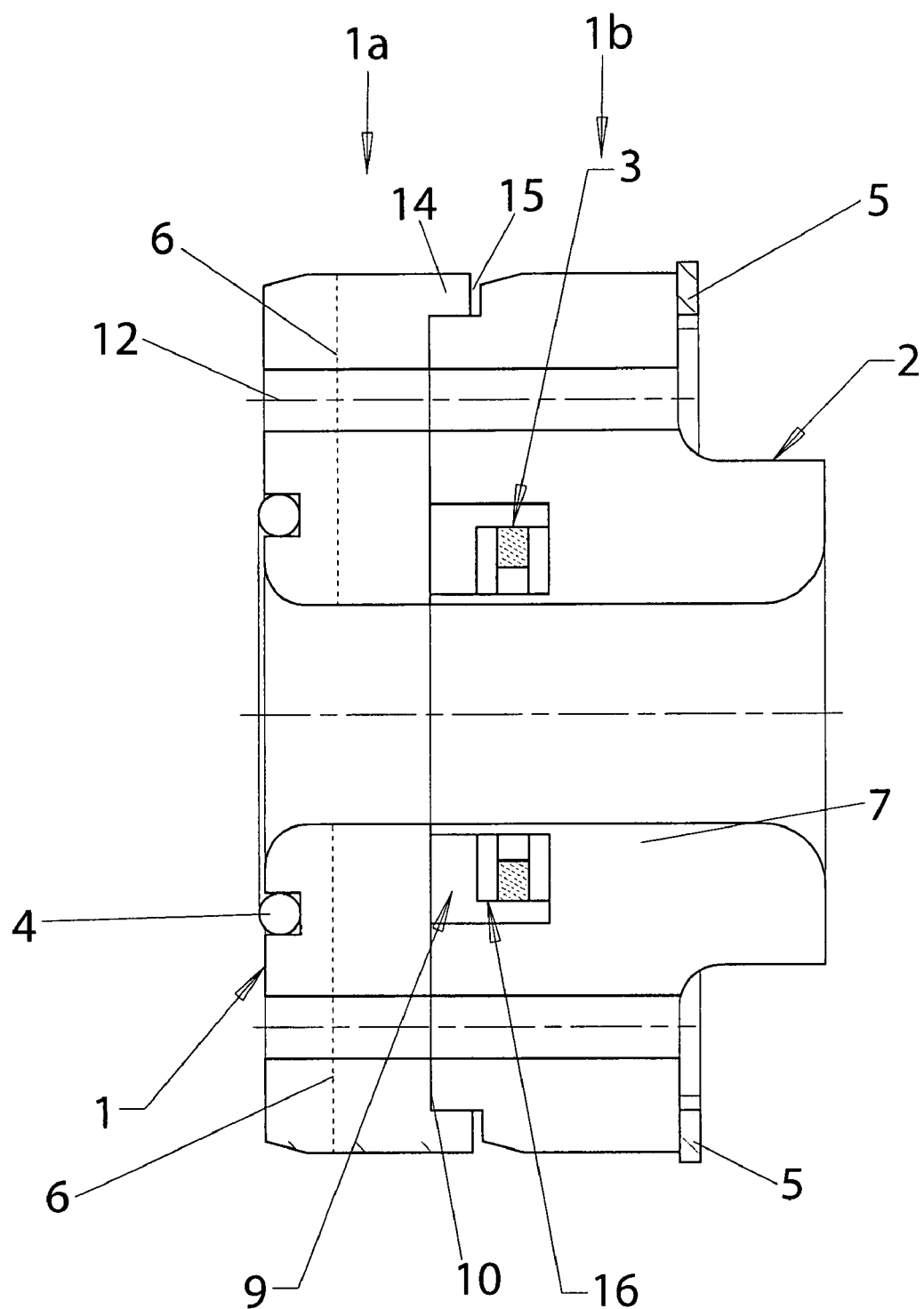
FIG. 2 shows another embodiment of the sliding element of the present invention.

FIG. 2 shows a second embodiment of the sliding element 1' as a separate component.

Contrary to FIG. 1, the sliding element is thus formed by two partial elements 1a, b which connect to each other in axial direction, and wherein a partial element 1a has an annular flange 14 at its outer circumference, and the other one has an annular indentation 15 at the respective location, which center both partial elements 1a, b radially relative to each other.

Flow channels 12 extend through the two partial elements in an aligned manner, wherein the alignment is achievable in the simplest manner, by some of flow channels 12 being used for bolting the partial elements together or securing them relative to each other through alignment pins.

The annular indentation 13 in which annular magnet 3 is located, is located in the bushing 1b so that the ring magnet is disposed approximately in the center of the axial extension of interior diameter 7 of bushing 1.

The interior wall between indentation 13 and interior diameter 7 is thereby sized as thin as possible in order to bring ring magnet 3 as close as possible to interior diameter 7 and, thus, to wave conductor unit 2a.

In this case, ring magnet 3 is flanked by two axially adjacent annular flux conductor pieces 16, and this entire magnet assembly is fixed in indentation 13 through glue or an encasement material 9.

As an additional difference, buffer ring 4 is positioned radially within the orifices of flow channels 12 in the solution seen in FIG. 2.

The enveloping flow of hydraulic fluid is made possible, however, through the orifices of flow channels 12 located therein, being connected through one of the radially extending flow grooves 6 in the front face with interior diameter 7, which are provided deeper than the groove for the buffer ring 4 preferably also extending to the outside to the outer diameter 11.

The invention claimed is:

1. A position sensor comprising:
   a magnetostrictive sensor with a stick-shaped sensor unit;
   at least one position indicator in the form of a position magnet:
   the position indicator includes a sliding element (1) made from abrasion resistant material with good sliding capability between the sensor unit and the position indicator and wherein said sliding element has an axial flow channel (12) shaped as pass through bores or grooves in an outer circumference (11).

2. The position sensor according to claim 1 wherein said abrasion resistant material is a plastic material having an abrasion resistance of less then 10 μm/km and selected from the group consisting of polyamide (PA) and Polyetheretherketone (PEEK).

3. The position sensor according to claim 1 wherein said sliding element has a friction coefficient relative to a wave conductor unit (2a) of less then μ=1.0.

4. The position sensor according to claim 1 wherein said sliding element has a creep elongation tension of less then 1.5 N/μmm$^2$.

5. The position sensor according to claim 1 wherein said abrasion resistant material of said sliding element has a moisture expansion of less than 8% through hydraulic fluid.

6. The position sensor according to claim 1 wherein said abrasion resistant material of said sliding element is a plastic material having a water absorption of less then 3%.

7. The position sensor according to claim 1 wherein said abrasion resistant material of said sliding element is a plastic chemically resistant against typical hydraulic fluids.

8. The position sensor according to claim 1 wherein said at least one position indicator is disposed close to an interior diameter (7) of said sliding element (1).

9. The position sensor according to claim 8 wherein an axial extension of said interior diameter (7) of said sliding element (I) sliding on said sensor unit corresponds to at least 0.5 times the diameter of said sensor unit.

10. The position sensor according to claim 8 wherein an axial extension of said interior diameter (7) of said sliding element (1) sliding on a wave conductor unit (2a) is at least two times the diameter of the sensor element.

11. The position sensor according to claim 8 wherein a clearance between said interior diameter (7) of said sliding element and an outer diameter of said sensor unit is maximally +/−0.5 mm, but minimally +/−0.1 mm.

12. The position sensor according to claim 8 wherein ends of said sliding interior circumferential surface are beveled or strongly rounded.

13. The position sensor according to claim 8 wherein an axial extension of the sliding element at an outer circumference (11) is less than at said inner diameter (7).

14. The position sensor according to claim 1 wherein front face orifices of said flow channels (12) are connected at least at one front face with radial flow grooves (6) in the front face, which reach from an interior diameter (7) to said outer circumference (11) of said sliding element.

15. The position sensor according to claim 1 wherein said sliding element is provided in two pieces with two partial elements (1a, b) connecting to each other in a slightly overlapping axial direction.

16. The position sensor according to claim 15 wherein said partial elements (1a,b) are centered relative to each other through a circumferential radially form locking annular flange (14) at one of said partial elements (1a), and a respective indentation (15) at the other partial element (1b).

17. The position sensor according to claim 15 wherein said two partial elements (1a,b) are screwed into each other or bonded.

18. The position sensor according to claim 1 wherein an annular groove for partially receiving an O-ring as an axial buffer (4) is provided in one of the front faces of said sliding element toward the interior diameter.

19. The position sensor according to claim 1 wherein said position indicator is a magnet (3) axially flanked on each side by an annular flux conductor piece (16).

20. The position sensor according to claim 1 wherein said position indicator being in the form of a ring magnet (3) or an entire magnet assembly is inserted and encased in an annular indentation (13) which is only open on a face.

21. The position sensor according to claim 20 wherein said indentation (13) is provided in a contact front face of one partial element (16).

22. The position sensor according to claim 1 wherein an exterior diameter (11) of said sliding element is inserted into a surrounding component with radial clearance and held through a snap ring (5) in a dead-end hole.

23. A sliding element for a position sensor comprising:
   an abrasion resistant plastic sliding element with good sliding capability relative to a wave conductor unit (2a); and
   an axial flow channel (12) shaped as pass-through bores or grooves in an outer circumference of said sliding element.

24. The sliding element according to claim 23 wherein said abrasion resistant material is a plastic material having an abrasion resistance of less then 10 μm/km and selected from the group consisting of polyamide (PA) and Polyetheretherketone (PEEK).

25. The sliding element according to claim 23 further having a friction coefficient relative to said wave conductor unit (2a) of less then μ=1.0.

26. The sliding element according to claim 23 further having a creep elongation tension of less then 1.5 N/μmm$^2$.

27. The sliding element according to claim 23 wherein said abrasion resistant material has a moisture expansion of less than 8% through hydraulic fluid.

28. The sliding element according to claim 23 wherein said abrasion resistant material is a plastic material having a water absorption of less then 3%.

29. The sliding element according to claim 23 wherein said abrasion resistant material is a plastic chemically resistant against typical hydraulic fluids.

30. The sliding element according to claim 23 wherein at least one position indicator is disposed close to an interior diameter (7) of said sliding element (1).

31. The sliding element according to claim 30 wherein an axial extension of said interior diameter (7) of said sliding element (1) sliding on a sensor unit corresponds to at least 0.5 times the diameter of the sensor unit.

32. The sliding element according to claim 30 wherein an axial extension of said interior diameter (7) of said sliding element (1) sliding on said wave conductor unit (2a) is at least two times the diameter of the sensor element.

33. The sliding element according to claim 30 wherein a clearance between said interior diameter (7) and an outer diameter of a sensor unit is maximally +/−0.5 mm, but minimally +/−0.1 mm.

34. The sliding element according to claim 30 wherein ends of said sliding interior circumferential surface are beveled or strongly rounded.

35. The sliding element according to claim 30 wherein an axial extension of the sliding element at an outer circumference (11) is less than at said inner diameter (7).

36. The sliding element according to claim 30 wherein said at least one position indicator is a magnet (3) axially flanked on each side by an annular flux conductor piece (16).

37. The sliding element according to claim 30 wherein said position indicator being in the form of a ring magnet (3) or an entire magnet assembly is inserted and encased in an annular indentation (13) which is only open on a face.

38. The sliding element according to claim 23 wherein an annular groove for partially receiving an O-ring as an axial buffer (4) is provided in one of the front faces of the sliding element toward an interior diameter.

39. The sliding element according to claim 23 wherein front face orifices of flow channels (12) are connected at least at one front face with radial flow grooves (6) in the front face, which reach from an interior diameter (7) to an exterior diameter (11) of the sliding element.

40. The sliding element according to claim 23 wherein said sliding element is provided in two pieces with two partial elements (1a, b) connecting to each other in a slightly overlapping axial direction.

41. The sliding element according to claim 40 wherein said partial elements (1a,b) are centered relative to each other through a circumferential radially form locking annular flange (14) at one of the partial elements (1a), and a respective indentation (15) at the other partial element (1b).

42. The sliding element according to claim 40 wherein said two partial elements (1a,b) are screwed into each other or bonded.

43. The slide element according to claim 38 wherein said indentation (13) is provided in a contact front face of one partial element (16).

44. The sliding element according to claim 23 wherein an exterior diameter (11) of said sliding element is inserted into a surrounding component with radial clearance and held through a snap ring (5) in a dead-end hole.

* * * * *

UNITED STATES PATENT AND TRADEMARK OFFICE
CERTIFICATE OF CORRECTION

| | | |
|---|---|---|
| PATENT NO. | : 7,944,201 B2 | Page 1 of 1 |
| APPLICATION NO. | : 11/825029 | |
| DATED | : May 17, 2011 | |
| INVENTOR(S) | : Klaus Manfred Steinich | |

It is certified that error appears in the above-identified patent and that said Letters Patent is hereby corrected as shown below:

On title page item [73], should read -- ASM Automation Sensorik Messtechnik GmbH, Moosinning (DE) --

Signed and Sealed this
Fifth Day of July, 2011

David J. Kappos
*Director of the United States Patent and Trademark Office*